United States Patent
Gerlach et al.

(10) Patent No.: US 11,521,587 B2
(45) Date of Patent: Dec. 6, 2022

(54) SOUND TRANSDUCER

(71) Applicant: Robert Bosch GmbH, Stuttgart (DE)

(72) Inventors: Andre Gerlach, Leonberg-Hoefingen (DE); Johannes Henneberg, Weil im Schoenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 654 days.

(21) Appl. No.: 16/488,030

(22) PCT Filed: Feb. 12, 2018

(86) PCT No.: PCT/EP2018/053415
§ 371 (c)(1),
(2) Date: Aug. 22, 2019

(87) PCT Pub. No.: WO2018/153712
PCT Pub. Date: Aug. 30, 2018

(65) Prior Publication Data
US 2021/0142772 A1 May 13, 2021

(30) Foreign Application Priority Data
Feb. 24, 2017 (DE) .......................... 102017203042.9

(51) Int. Cl.
*G10K 9/22* (2006.01)
*G10K 13/00* (2006.01)

(52) U.S. Cl.
CPC ............... *G10K 9/22* (2013.01); *G10K 13/00* (2013.01)

(58) Field of Classification Search
CPC ........... G10K 9/22; G10K 13/00; G01S 7/521
See application file for complete search history.

(56) References Cited

U.S. PATENT DOCUMENTS

| | | | | |
|---|---|---|---|---|
| 4,907,207 A | * | 3/1990 | Moeckl | G10K 9/122 181/170 |
| 5,670,932 A | * | 9/1997 | Kizima | G10K 9/122 381/191 |

(Continued)

FOREIGN PATENT DOCUMENTS

| | | | | |
|---|---|---|---|---|
| CN | 103209827 A | * | 7/2013 | ........... B29C 70/086 |
| DE | 102012201884 A1 | | 8/2013 | |

(Continued)

OTHER PUBLICATIONS

International Search Report dated May 15, 2018 of the corresponding International Application PCT/EP2018/053415 filed Feb. 12, 2018.

*Primary Examiner* — Oyesola C Ojo
(74) *Attorney, Agent, or Firm* — Norton Rose Fulbright US LLP; Gerard Messina

(57) ABSTRACT

A sound transducer has a diaphragm cup, a transducer element, and a housing, the diaphragm cup having a diaphragm and a wall. The diaphragm, the wall, and at least one housing part are formed in one piece as a fiber-plastic composite component. At least one first region of the fiber-plastic composite component is reinforced with fibers, and at least one second region of the fiber-plastic composite component is free of fibers, so that waves in the fiber-plastic composite component are at least partly reflected at a transition from the at least one first region to the at least one second region.

12 Claims, 10 Drawing Sheets

(56) References Cited

U.S. PATENT DOCUMENTS

| | | | | |
|---|---|---|---|---|
| 5,751,827 A * | 5/1998 | Takahashi | ............ | H04R 17/00 |
| | | | | 381/191 |
| 7,554,248 B2 * | 6/2009 | Oda | ............ | G10K 9/122 |
| | | | | 310/348 |
| 8,104,351 B2 * | 1/2012 | Jung | ............ | G10K 9/22 |
| | | | | 73/632 |
| 2006/0158066 A1 * | 7/2006 | Oda | ............ | G01S 15/931 |
| | | | | 310/338 |

FOREIGN PATENT DOCUMENTS

| | | | | |
|---|---|---|---|---|
| DE | 102012211011 A1 | | 1/2014 | |
| DE | 102015106044 A1 * | 10/2016 | ............ | G01S 7/521 |
| DE | 102015106044 A1 | | 10/2016 | |
| EP | 0308931 A2 | | 3/1989 | |
| JP | 4078726 B2 * | | 4/2008 | ............ B32B 5/12 |
| JP | 2010050963 A * | | 3/2010 | ............ H04R 17/00 |
| JP | 2010050963 A | | 3/2010 | |

* cited by examiner

SOUND TRANSDUCER

CROSS-REFERENCE TO RELATED APPLICATIONS

The present application is the national stage of International Pat. App. No. PCT/EP2018/053415 filed Feb. 12, 2018, and claims priority under 35 U.S.C. § 119 to DE 10 2017 203 042.9, filed in the Federal Republic of Germany on Feb. 24, 2017, the content of each of which are incorporated herein by reference in their entireties.

FIELD OF THE INVENTION

The present invention relates to a sound transducer including a diaphragm cup, a transducer element, and a housing, the diaphragm cup having a diaphragm and a wall.

BACKGROUND

Ultrasonic sensors are used, inter alia, in automotive and industrial applications in order to acquire the surrounding environment. Objects in the surrounding environment can be recognized in that the ultrasonic sensor sends out an ultrasonic signal and the ultrasonic echo reflected by an object is then received. The distance from the object can then be calculated from the runtime between the sending out of the ultrasonic signal and the reception of the ultrasonic echo, as well as the known speed of sound.

Ultrasonic sensors typically include a sound transducer having a diaphragm, a transducer element, and a housing. The transducer element is for example a piezoceramic element that, after application of an electrical voltage, sets the diaphragm into vibration, or, for the reception of ultrasonic echoes, converts the vibrations at the diaphragm, excited by the sound pressure in front of the diaphragm, into an electrical signal. Such sound transducers are known in the existing art, such as DE 10 2012 201 884 A1.

For the proper functioning of the sound transducer, it is necessary to avoid coupling vibrations into the housing of the sound transducer, because strong introduction of vibration into the housing causes a prolonged residual vibration of the diaphragm after termination of the excitation of the diaphragm by the transducer element. Such residual vibration limits the smallest distance capable of being measured by the ultrasonic sensor. The longer the residual vibrations, the larger the smallest measurable distance. Therefore, in the existing art it is standard to produce the sound transducer and the housing as separate individual parts and to join them using an additional seal. As a seal, for example a silicone ring is used that, in addition to the function of sealing the housing, also takes over the function of decoupling the vibration. However, a disadvantage here is that the seals are a potential weak point for the introduction of moisture or contamination, and additional working steps in the production of the ultrasonic sensor are required to install the seal.

SUMMARY

According to example embodiments of the present invention, a sound transducer includes a diaphragm cup, a transducer element, and a housing, the diaphragm cup having a diaphragm and a wall. In addition, the diaphragm, the wall of the diaphragm cup, and at least one housing part are made in one piece as a fiber-plastic composite component, at least one first region of the fiber-plastic composite component being reinforced with fibers, and at least one second region of the fiber-plastic composite component being free of fibers, so that waves in the composite component are at least partly reflected at a transition from the at least one first region to the at least one second region.

The sound transducer has a diaphragm that is preferably realized as a circular surface and is limited in the diaphragm cup by a wall that is preferably correspondingly circular-cylindrical in shape. Alternatively, it is conceivable for the diaphragm, and correspondingly the wall of the diaphragm cup, to have other shapes. Thus, the diaphragm can for example also be realized as an oval surface or as a rectangular surface, the wall of the diaphragm cup having a corresponding shape, and thus also being shaped for example as an oval cylinder or as a rectangular prism.

At least one housing part is connected in one piece to the wall of the diaphragm cup. The housing of the sound transducer accommodates the transducer element and, if warranted, additional components, such as means for controlling the transducer element. In addition, the housing can also include in particular fastening means with which the sound transducer can be fastened at its location of use.

For the reduction of a disturbing vibration of the housing of the sound transducer, different regions have different vibration properties in the fiber-plastic composite component. Waves that for example propagate from the diaphragm into the composite component are then at least partly reflected at a transition between regions having different vibration properties. Due to the at least partial reflection, a transmission of the waves between the regions having different vibration properties is reduced.

For the formation of the regions having different vibration properties, at least one first region of the fiber-plastic composite component is reinforced with fibers and at least one second region of the fiber-plastic composite component is free of fibers. The introduction of fibers in order to reinforce the fiber-plastic composite component changes the density or the mass of the relevant region, as well as its strength and rigidity. Both the density or the mass determinable from the density and the volume, and the rigidity have an effect on the vibration properties of the respective region.

As an additional possibility for the at least partial reflection of waves inside the fiber-plastic composite component, in an example embodiment at least one impact point is situated on the outside and/or on the inside of the fiber-plastic composite component, in the form of an edge or rib. Through the additional provision of an edge or rib, in the region of this edge or rib the additional mass and the increased rigidity form an impact point at which waves running through the fiber-plastic composite component are at least partially reflected. The edge or rib is made in one piece with the fiber-plastic composite component.

Preferably, the edges and/or ribs are situated at the points in the fiber-plastic composite component at which there is a transition between a first region and a second region. In this way, through the additional edge or rib, the wave-reflecting effect of the transition between a region reinforced with fibers and an unreinforced region is further amplified.

In addition, inside the fiber-plastic composite component, in an example embodiment, at least one rigidifying structure is connected with the fiber-plastic composite component. The at least one rigidifying structure is, in an example embodiment, situated in the area of the wall of the diaphragm cup.

The rigidifying structures preferably have a high rigidity, a high mass, and/or a high damping effect for vibrations.

Through the provision of at least one separate rigidifying structure in the region of the wall of the diaphragm cup, the rigidifying structures are situated in the region of the transition between the diaphragm at the end face and the part of the housing made in one piece in the composite component. In this way, a transmission of vibrations to the housing is effectively prevented.

The material of the rigidifying structure is preferably selected from a metal, a ceramic, a plastic, a fiber-reinforced plastic, or a combination of at least two of these materials.

The material of the fiber-plastic composite component preferably includes a matrix material and fibers embedded in the matrix material.

In an example embodiment, the fibers are embedded in the at least one first region in a one-layer or multi-layer fiber structure. In an example embodiment, the fiber structure is selected from a weave, a non-crimp fabric, a warp-knitted fabric, a knit fabric, a meshwork, a nonwoven, or a combination of at least two of these fiber structures.

In an example embodiment, the fibers are selected from glass fibers, carbon fibers, aramide fibers, basalt fibers, fibers made of ultra-high-molecular-weight polyethylene (UHMWPE), fibers made of poly(p-phenylene-2,6-benzobisoxazole) (PBO), fibers made of liquid crystal polymer (LCP), flax fibers, or combinations of at least two of these fibers.

The matrix material of the fiber-plastic composite component is a plastic. The plastic is preferably selected from a thermoplastic or thermosetting plastic. In particular, epoxy resins are suitable as matrix material.

For the effective prevention of the transmission of vibrations to the housing part of the fiber-plastic composite component, in an example embodiment, at least one partial area of the diaphragm and/or at least one partial area of the wall of the diaphragm cup and/or at least a partial area of the housing part is fiber-reinforced. In an example embodiment, the change from the first region to the second region is at the transition from the diaphragm to the wall of the diaphragm cup and/or from the wall of the diaphragm cup to the housing part.

If the diaphragm is provided with at least one fiber-reinforced subregion, then in an example the shape of the at least one fiber-reinforced subregion of the diaphragm to be selected from a circular surface, an oval surface, a circular annular shape, an oval annular shape, a rectangular shape, or a combination of at least two of the shapes. In the case of a combination of a plurality of these shapes, in an example these shapes are configured concentrically, i.e., the shapes have a common midpoint. In an example embodiment, the diaphragm is realized entirely as a first region, i.e., as a fiber-reinforced region.

If the fibers are put into in a plurality of layers, then for each of these layers the same geometric shape can be used for the at least one fiber-reinforced subregion. Alternatively, the geometrical shape of the at least one fiber-reinforced subregion can be varied for each of the layers. For example, in a first layer the fiber-reinforced subregion can have a rectangular shape, and in a further layer the fiber-reinforced subregion can have a circular shape.

In an example embodiment, at least two different resonant frequencies of the diaphragm are determined by the choice of the shape of the at least one fiber-reinforced subregion and/or through the choice of the number of subregions reinforced with fibers.

The housing part of the fiber-plastic composite component is preferably realized as a housing upper part, the sound transducer preferably also including a housing lower part connected to the housing upper part.

The connection between the housing upper part and the housing lower part is preferably realized in such a way that neither moisture nor dirt can penetrate into the interior of the housing. However, because this connection is not required to have any vibration-damping property, a welding or gluing can for example be carried out in order to connect the housing lower part to the housing upper part.

In an example embodiment, the transducer element of the sound transducer is realized as a piezoelectric transducer, an electrostatic transducer, an electret transducer, or a piezo-electret transducer. In addition, the sound transducer can include further components inside the housing, such as means for controlling the transducer element.

In an example embodiment, the housing has a connecting element that can create an electrical connection to the sound transducer. The connecting means can for example be a cable routed through the housing, or an electrical plug connection.

Due to the proposed one-piece realization of the diaphragm, the wall of the diaphragm cup, and at least one housing part, the provision of a sealing element between the transducer cup, formed from the wall and the diaphragm, and the housing upper part can be omitted. A transmission of vibrations from the diaphragm to the housing upper part is here avoided by providing a transition between at least one first region, reinforced with fibers, and at least one second region that is free of fibers. At the boundary between the at least one first region and the at least one second region, the vibration characteristics of the proposed composite component change in a discontinuous manner, so that there is an at least partial reflection of waves traveling through the composite component. A transmission of the waves past the transition is here significantly reduced without the system requiring further damping elements such as an elastomer seal.

In example embodiments of the present invention, the reflection of the waves caused by the transition from fiber-reinforced to non-reinforced regions is further improved by the provision of rigidifying structures and/or edges. Both through the provision of edges, or ribs, and through the provision of rigidifying structures, discontinuous changes in the vibration properties of the proposed composite component are achieved, and an at least partial reflection of the waves occurs at these transition regions.

Due to the possibility of doing without the provision of an elastic seal in the housing of the sound transducer, the robustness of the sound transducer against environmental influences is further reinforced, because no weak point in the housing is present that would permit the penetration of moisture or contamination. In addition, the production of the sound transducer is simplified because the number of components to be joined is reduced.

In example embodiments of the present invention, the sound transducer design has a diaphragm subdivided into a plurality of subregions, at least one first subregion of the diaphragm being fiber-reinforced and at least one second subregion of the diaphragm being free of fibers. This design of the diaphragm yields the possibility of realizing two or more resonant working frequencies having different directional characteristics of the sound radiation and sound reception. Using a suitable electronics system, a plurality of working frequencies can be used to select a suitable directional characteristic, depending on the particular situation.

With such a sound transducer design, smaller distances of the working frequencies can be realized than in sound transducers according to the existing art. These smaller distances of the working frequencies are particularly advantageous for the use of a plurality of working frequencies, with a simple signal-processing electronics system.

In the design of the diaphragm, the fibers can be configured in a plurality of layers. Here, for each layer the geometric design of the fiber-reinforced subregions and of the fiber-free subregions of the diaphragm can be varied, so that one or more fiber layers have a geometric design of the subregions that is different from other fiber layers. Such a combination yields greater design possibilities with regard to the deliberate setting of the resonant working frequency and the directional characteristic.

DETAILED DESCRIPTION

Figure 1:
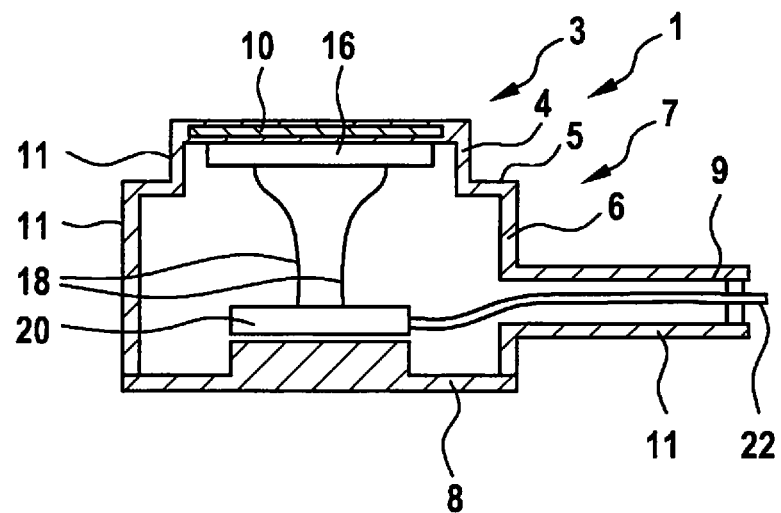
FIG. 1 illustrates a sound transducer having a fiber-plastic composite component according to an example embodiment of the present invention.

In the following description of the example embodiments of the present invention, identical elements are designated with identical reference characters, and a repeated description of these elements in individual cases is omitted. The figures show the subject matter of the present invention only schematically.

FIG. 1 shows a schematic representation of a sound transducer 1, in a sectional view from the side. Sound transducer 1 includes a fiber-plastic composite component 7 that is made in one piece and includes a diaphragm cup 3 and a housing part 6. Diaphragm cup 3 has at its end face a diaphragm 2 that adjoins a wall 4 of diaphragm cup 3. On the inside of diaphragm 2, a transducer element 16 is accommodated that is realized for example as a piezoelement. Alternatively, transducer element 16 can be realized as an electrostatic transducer, an electret transducer, or a piezoelectret transducer.

Transducer element 16 is connected to a control electronics 20 via connecting lines 18. Housing part 6, realized in one piece with fiber-plastic composite component 7, is realized as a housing upper part in the example embodiment of FIG. 1. The part of housing part 6 adjoining diaphragm cup 3 is substantially realized as a cylindrical shape having a shoulder 5 adjoining diaphragm cup 3. Housing part 6 additionally has a connecting region 9. A connecting line 22 that produces an electrical connection to control electronics 20 is routed through connecting region 9.

In the depicted example, control electronics 20 is situated on a housing lower part 8 that is connected to the housing upper part. Alternatively, control electronics 20 is built into housing part 6 or into fiber-plastic composite component 7. Housing lower part 8 then acts only as a cover in order to close the sensor.

In the example embodiment shown in FIG. 1, fiber-plastic composite component 7 is reinforced in the region of diaphragm 2 with fibers, so that a fiber-reinforced region 10 is formed there. Wall 4 of diaphragm cup 3, as well as housing part 6 with shoulder 5 and connecting region 9, are each free of fibers, and are thus realized as fiber-free regions 11.

In the example embodiment shown in FIG. 1 of fiber-plastic composite component 7, between diaphragm 2 and wall 4 of diaphragm cup 3 there is a transition between first region 10, reinforced with fibers, and second region 11, free of fibers. At this transition, the material properties of fiber-plastic composite component 7 change discontinuously, and in particular the vibration properties of fiber-plastic composite component 7 change discontinuously. Waves that, going out from diaphragm 2, run through fiber-plastic composite component 7, are at least partly reflected at this transition, so that a transmission of a vibration of diaphragm 2 via wall 4 to housing part 6 is reduced.

In FIGS. 2-7, embodiments of fiber-plastic composite component 7 are shown. FIGS. 2-7 each shows fiber-plastic composite component 7 in a sectional view from the side. The geometric shape of fiber-plastic composite component 7 is identical in all six of the example embodiments shown in FIGS. 2-7. Fiber-plastic composite component 7 has in each case a diaphragm cup 3 having a diaphragm 2 and a wall 4. Wall 4 goes over into a housing part 6, housing part 6 having a connecting region 9.

Fiber-plastic composite component 7 differs in each case only in the configuration of first regions 10, reinforced with fibers, and of second regions 11, which are free of fibers.

Figure 2:
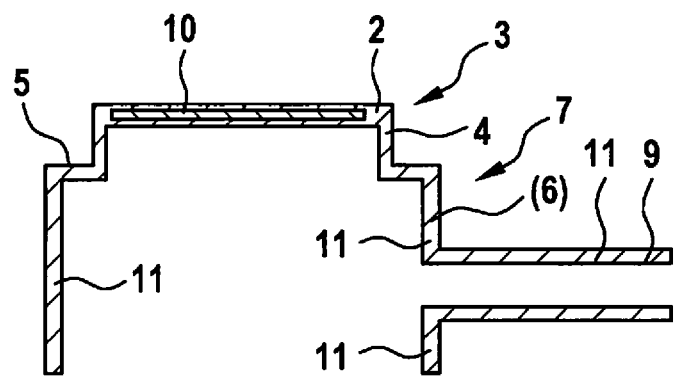
FIGS. 2-7 show example embodiments of the fiber-plastic composite component having at least one fiber-reinforced region and at least one region that is free of fibers.

In the example embodiment of FIG. 2, as is shown with reference to FIG. 1, only diaphragm 2 is realized as first region 10, reinforced with fibers. The other regions of fiber-plastic composite component 7 are each formed as second regions 11, free of fibers.

Figure 3:
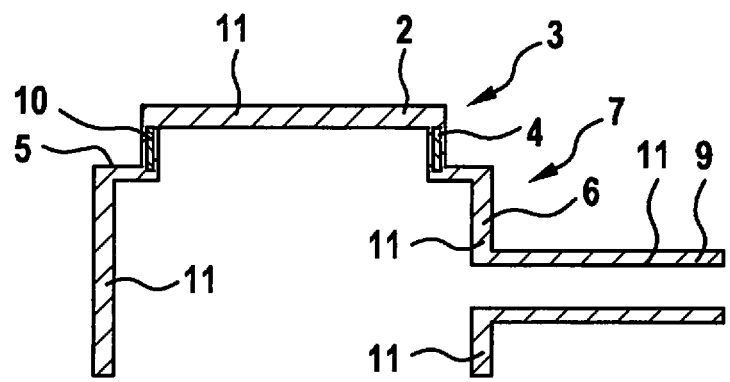

In the variant embodiment of FIG. 3, only wall 4 of diaphragm cup 3 is fashioned as a first region 10 that is reinforced with fibers. Diaphragm 2 and housing part 6 are formed as second regions 11, free of fibers.

Figure 4:
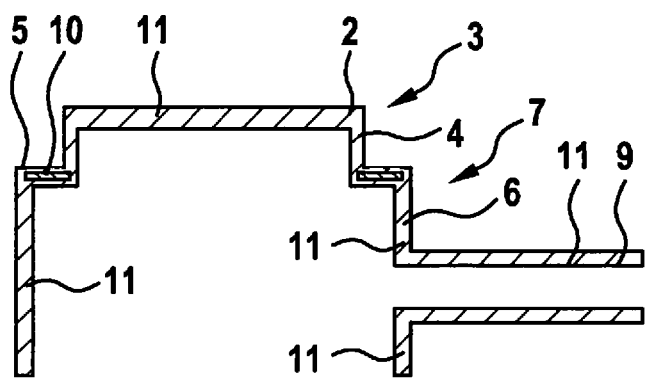

In FIG. 4, diaphragm 2 and wall 4 of diaphragm cup 3 are realized as second regions 11 that are free of fibers. In the example embodiment shown in FIG. 4, housing part 6 has a shoulder 5, situated adjacent to wall 4, having first fiber-reinforced region 10. The other parts of housing part 6 are realized as second region 11, free of fibers.

Figure 5:
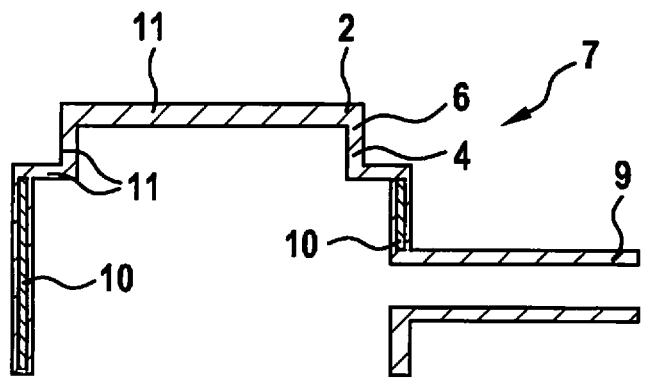
Figure 6:
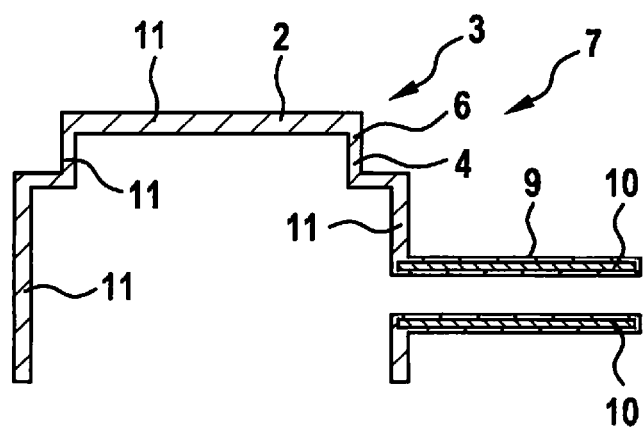

In FIGS. 5 and 6, as described with reference to 4, both diaphragm 2 and wall 4 are realized as second regions 11 that are free of fibers. In the example embodiments of FIGS. 5 and 6, subregions of housing part 6 are in each case realized as first region 10, first region 10 in each case not adjoining wall 4 of diaphragm cup 3.

In the example of FIG. 6, only connecting region 9 is realized as a first region 10, while the rest of fiber-plastic composite component 7 is realized as second region 11, free of fibers.

Figure 7:
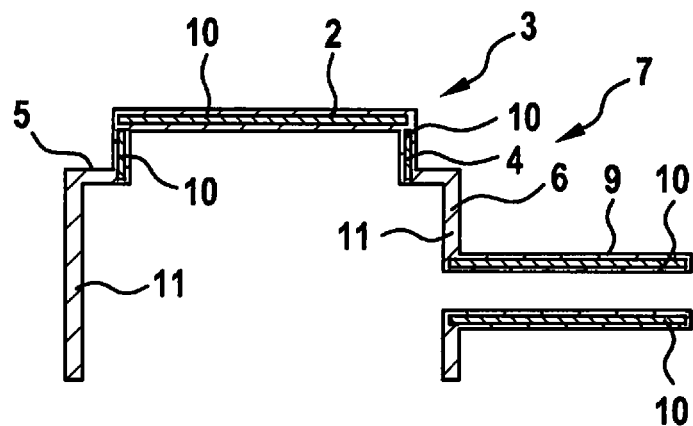

The examples shown in FIGS. 2-6 for the configuration of the at least one first region 10 and at least one second region 11 are to be understood only as examples. These example embodiments can be combined with one another in any manner, as is shown for example in FIG. 7. FIG. 7 shows a combination of the configuration of the at least one first region 10 of FIGS. 2, 3, and 6.

In addition, many other configurations are conceivable for the configuration of the first regions and of the second regions.

FIGS. 8-12 each shows a fiber-plastic composite component 7, which, as described already with reference to FIG. 2, has a diaphragm 2, a wall 4 of diaphragm cup 3, and a housing part 6. In the sectional representations of FIGS. 8-12, it can be seen that diaphragm 2 is realized as a first region 10 that is reinforced with fibers. The remaining regions of fiber-plastic composite component 7 are free of fibers. Through the transition from a first region 10 reinforced with fibers to a second region 11 free of fibers, at the transition between diaphragm 2 and wall 4, a change of the vibration properties of fiber-plastic composite component 7 is achieved by which the waves that, going out from diaphragm 2, move in the direction of housing part 6 are at least partly reflected.

In order to further support the reflection of the waves and to further reduce vibrations outside diaphragm 2 of fiber-plastic composite component 7, at least one projection in the form of an edge 12 is situated at the transition from diaphragm 2 to wall 4 of diaphragm cup 3 in each of the example embodiments of FIGS. 8-12. In the region of edge 12, relative to the other regions of fiber-plastic composite component 7, there is an increased quantity of material, so that this region has different vibration properties than the other parts of fiber-plastic composite component 7.

Figure 8:
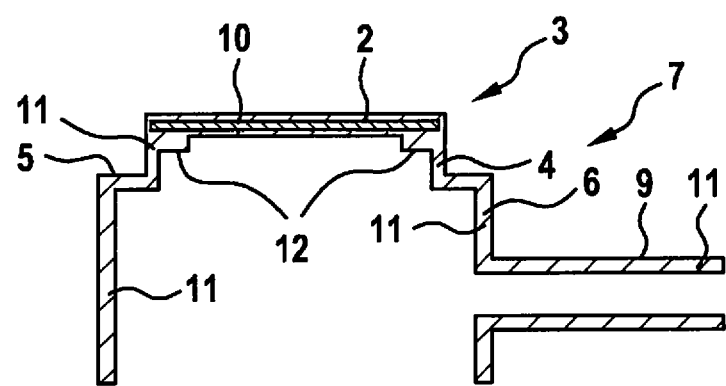
FIGS. 8-12 show example embodiments of the fiber-plastic composite component having a fiber-reinforced diaphragm and edges situated on the inside of the fiber-plastic composite component.
Figure 9:
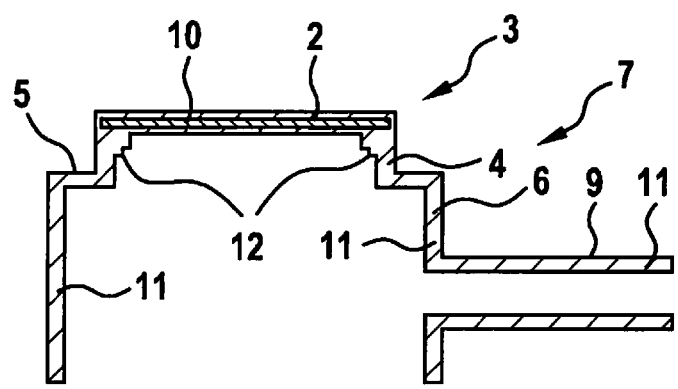

In the example embodiment of FIG. 8, a single edge 12 is provided that is formed on the inside of fiber-plastic composite component 7, in the area of the transition from wall 4 to diaphragm 2, running around circumferentially. In the example embodiment of FIG. 9, edge 12 has two steps, so that edge 12 provides not just one impact point at which waves can be reflected, but provides two of them in direct succession.

Figure 10:
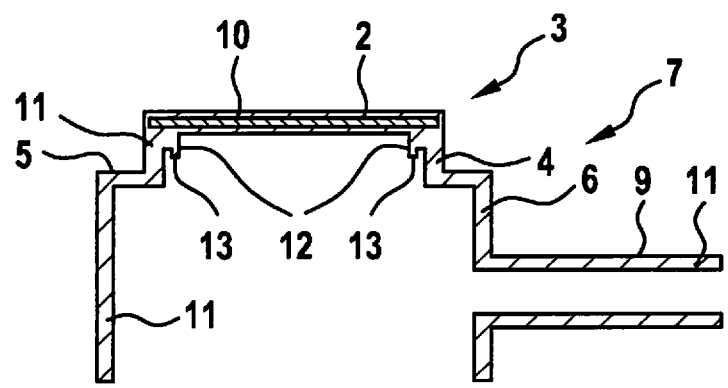

In the example embodiment of FIG. 10, on edge 12 a circumferential rib 13 is additionally provided that is connected to edge 12 with a material fit and, due to the additional material, further increases the rigidity and the mass in this region. In this way, the provision of rib 13 also results in an impact point at which waves in the material are at least partly reflected.

Figure 11:
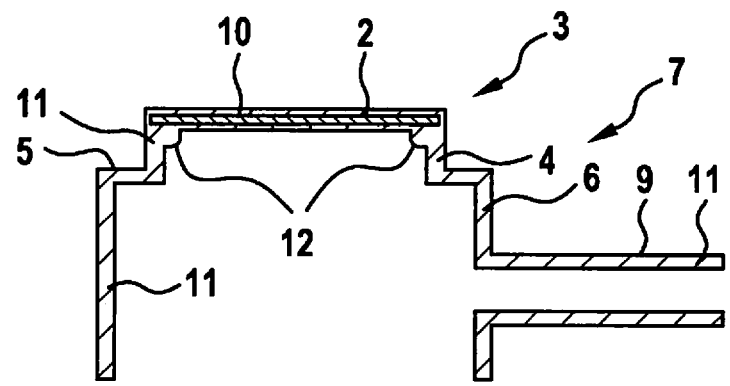

In the example embodiment of FIG. 11, edge 12 is rounded off, but otherwise corresponds to the example embodiment described with reference to FIG. 8.

Figure 12:
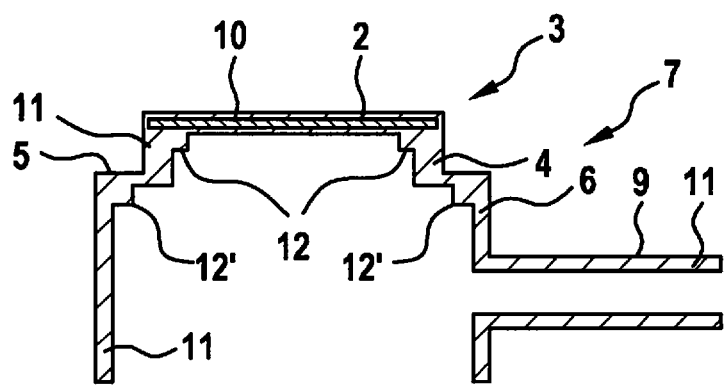

In the example embodiment shown in FIG. 12, in addition to the example embodiment already described with reference to FIG. 8, an additional edge 12' is situated in the area of housing part 6. In this way, in this example embodiment, two impact points are formed that particularly effectively suppress a transmission of waves going out from diaphragm 2 at connection region 9.

Of course, the variant embodiments shown in FIGS. 8-12 can be combined in any desired manner. In addition, it is conceivable to situate edges and/or ribs at additional positions not shown in FIGS. 8-12. In each case, the edges or ribs are preferably made with a material fit in the fiber-plastic composite component.

Figure 13:
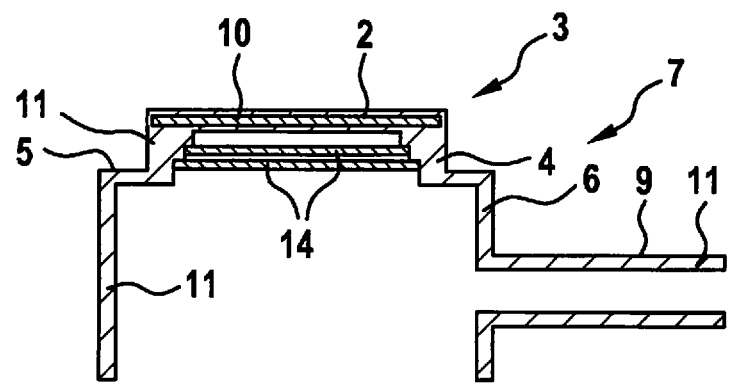
FIGS. 13 and 14 show example embodiments of the fiber-plastic composite component with additional rigidifying structures.
Figure 14:
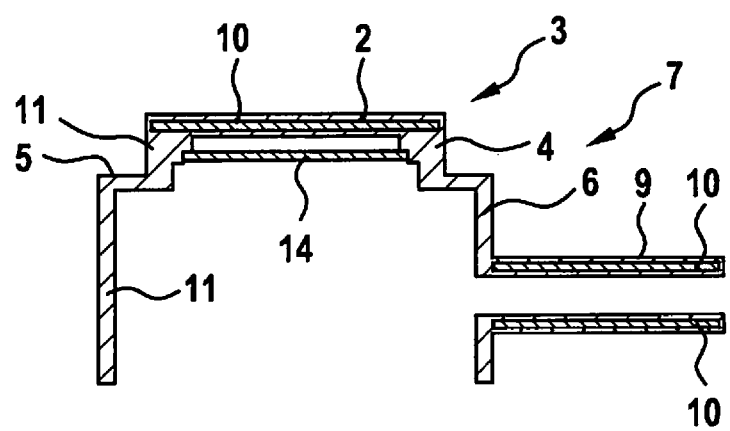

In FIGS. 13 and 14, two example embodiments of fiber-plastic composite component 7 are shown, fiber-plastic composite component 7 again having a diaphragm 2, a wall 4, and a housing part 6.

In the example embodiment shown in FIG. 13, in the area of wall 4 two rigidifying structures 14 are connected to fiber-plastic composite component 7. At the points at which rigidifying structures 14 are connected to fiber-plastic composite component 7, the rigidity is increased, so that an impact point results there. At the impact points introduced by the two rigidifying structures 14, waves running through fiber-plastic composite component 7 are at least partly reflected, so that the transmission of waves from diaphragm 2 to housing part 6 is significantly reduced.

In the embodiment shown in FIG. 14, in contrast to the example embodiment described with reference to FIG. 13, only one rigidifying structure 14 is provided. In order to reduce a transmission of waves, in particular into connecting region 9, in the example embodiment shown in FIG. 14 connecting region 9 is realized as a first region 10 and is reinforced with fibers.

Compared to the remaining parts of housing part 6, realized as second regions 11, i.e., being free of fibers, in connecting region 9 the vibration properties of fiber-plastic composite component 7 are changed, so that an impact point arises at the transition, and waves running through fiber-plastic composite component 7 are at least partly reflected.

The rigidifying structures 14 shown in FIGS. 13 and 14 can of course also be combined with the embodiments shown in FIGS. 2-12. In addition, the person skilled in the art can also situate rigidifying structures 14 at other positions.

In each of FIGS. 15-19, fiber-plastic composite components 7 are shown in plan view, and in each case at least one subregion of end-face diaphragm 2 is realized as a first region 10 that is reinforced with fibers, and at least one further subregion of diaphragm 2 is realized as a second region 11 that is free of fibers.

Figure 15:
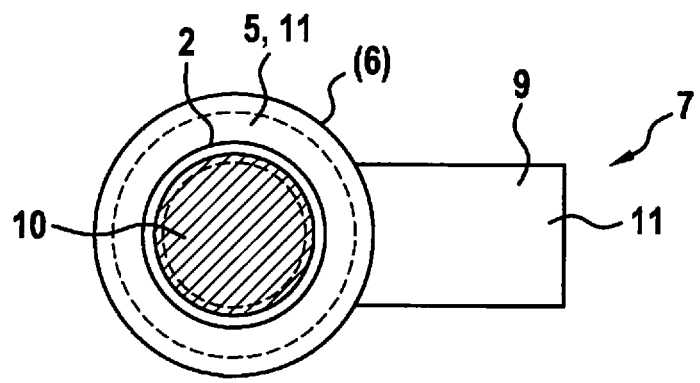
FIGS. 15-20 show example embodiments of the fiber-plastic composite component, with the diaphragm reinforced in subregions.

In the example embodiment shown in FIG. 15, a single first region 10 of diaphragm 2 is reinforced with fibers. This first region 10 is realized in the form of a circular surface that is centered on the likewise circular surface of diaphragm 2. In the example embodiment shown in FIG. 15, the surface of diaphragm 2 is realized entirely as first region 10.

Figure 16:
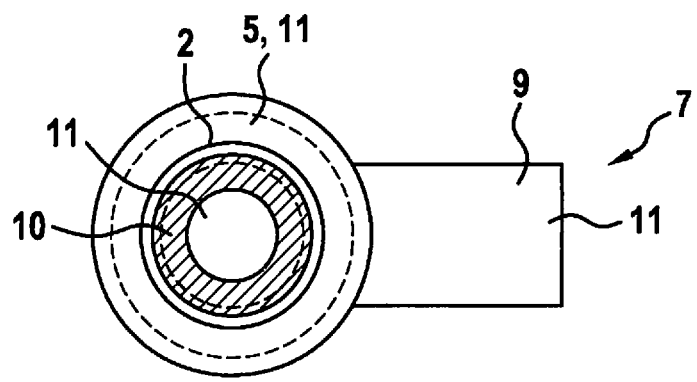

In the example embodiment shown in FIG. 16, the single first region 10, which is reinforced with fibers, is realized as a circular ring whose midpoint coincides with the midpoint of the surface of diaphragm 2. In this way, in the center of diaphragm 2 a second region 11 is formed that is free of fibers.

Figure 17:
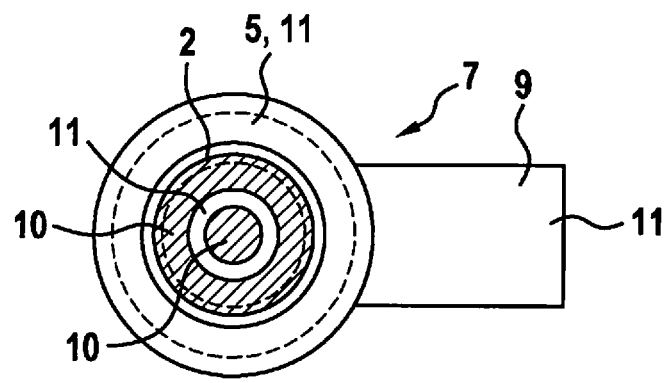

In the embodiment shown in FIG. 17, in addition to the single first region 10 of FIG. 16, a further first region 10 in the center of diaphragm 2 is formed in the shape of a circular surface.

Figure 18:
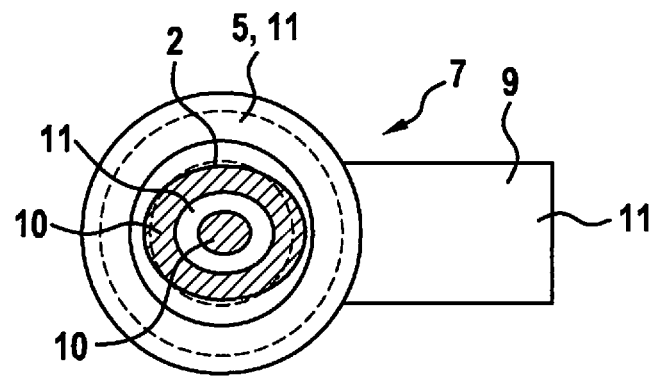

In the example embodiment shown in FIG. 18, two first regions 10 are formed on the surface of diaphragm 2 that are reinforced with fibers. Here, the two first regions 10 are situated concentrically, i.e., their two midpoints coincide. One of the first regions 10 is realized as an oval surface and another first region 10 is realized as an oval ring. The surface of diaphragm 2 situated between the two first regions 10 is formed as a second region 11 that is not reinforced with fibers.

Figure 19:
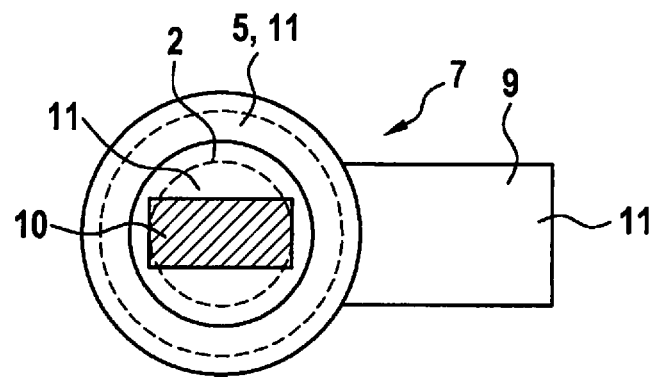

FIG. 19 shows a diaphragm 2 that has a single first region 10. First region 10 is here realized as a rectangular surface whose midpoint corresponds to the midpoint of diaphragm 2.

Figure 20:
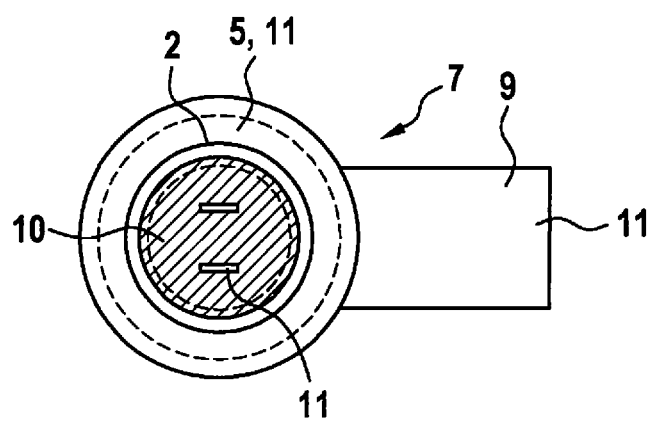

FIG. 20 shows a diaphragm 2 that is formed as a first region 10 except for two openings in the form of two rectangles, and is thus reinforced with fibers. The two rectangular openings are two second regions 11 that are not reinforced with fibers.

In the example embodiments shown in FIGS. 15-20, diaphragm 2 has in each case at least one first region 10 and, if warranted, a second region 11. Due to this design, not only can the transmission of vibrations to housing part 6 be reduced, but in addition the mechanical properties of diaphragm 2 can be adjusted in such a way that a particular specified radiation behavior is achieved.

A further advantage of the present invention results from the design of the sound transducer shown in FIGS. 15-20. The sound transducer design having a diaphragm reinforced in subregions offers the possibility of realizing two or more resonant working frequencies having different directional characteristics for sound radiation and sound reception. A plurality of operating frequencies can be used, using a suitable electronics system, to select a suitable directional characteristic as a function of the particular situation.

With such a sound transducer design, smaller intervals of the working frequencies can be realized than with sound transducers according to the existing art. These smaller intervals of the working frequencies are particularly advantageous for the use of a plurality of working frequencies with a simple signal-processing electronics system.

The present invention is not limited to the example embodiments described herein and their highlighted aspects. Rather, within the scope indicated by the claims, a large number of modifications are possible that lie within the range of normal activity of those skilled in the art.

What is claimed is:

1. A device comprising:
   a diaphragm cup that includes a diaphragm and a wall;
   a transducer; and
   a housing;
   wherein:
      the diaphragm, the wall of the diaphragm cup, and at least one part of the housing are formed as a one-piece fiber-plastic composite component;
      at least one first region of the fiber-plastic composite component is reinforced with fibers and at least one second region of the fiber-plastic composite component is free of the fibers so that waves in the fiber-plastic composite component are at least partly reflected at a transition from the at least one first region to the at least one second region,
      wherein at least one edge or rib is arranged on an outer side and/or on an inner side of the fiber-plastic composite component so that the waves in the fiber-plastic composite component are at least partly reflected in the region of the at least one edge or rib.

2. A device comprising:
   a diaphragm cup that includes a diaphragm and a wall;
   a transducer; and
   a housing;
   wherein:
      the diaphragm, the wall of the diaphragm cup, and at least one part of the housing are formed as a one-piece fiber-plastic composite component;
      at least one first region of the fiber-plastic composite component is reinforced with fibers and at least one second region of the fiber-plastic composite component is free of the fibers so that waves in the fiber-plastic composite component are at least partly reflected at a transition from the at least one first region to the at least one second region,
      wherein at least one edge or rib is arranged on, and in one piece with, an outer side and/or on an inner side of the fiber-plastic composite component so that the waves in the fiber-plastic composite component are at least partly reflected in the region of the at least one edge or rib.

3. The device of claim 1, wherein inside the fiber-plastic composite component, at least one rigidifying structure is connected to the fiber-plastic composite component.

4. The device of claim 3, wherein material of the rigidifying structure is a metal, a ceramic, a plastic, a fiber-reinforced plastic, or a combination of two or more of these materials.

5. The device of claim 1, wherein the fibers in the at least one first region are in the form of a one-layer or multi-layer fiber structure, the fiber structure being one of or a combination of two or more of a weave, a non-crimp fabric, a warp-knitted fabric, a knit fabric, a meshwork, and a non-woven structure.

6. The device of claim 1, wherein the fibers are one of or a combination of two or more of glass fibers, carbon fibers, aramide fibers, basalt fibers, fibers made of ultra-high-molecular-weight polyethylene (UHMWPE), fibers made of poly(p-phenylene-2,6-benzobisoxazole) (PBO), fibers made of liquid crystal polymer (LCP), and flax fibers.

7. The device of claim 1, wherein the plastic of the fiber-plastic composite component is a thermoplastic or thermosetting plastic.

8. The device of claim 1, wherein the at least one first region includes at least one subregion of the diaphragm, at least one subregion of the wall, and/or at least one subregion of the housing part.

9. The device of claim 8, wherein at least two different resonant frequencies of the diaphragm are caused by a shape of the at least one fiber-reinforced subregion and/or by a number of the subregions reinforced with fibers.

10. The device of claim 1, wherein the at least one first region includes at least one subregion of the diaphragm that is shaped as a circular surface, an oval surface, a circular annular shape, an oval annular shape, a rectangular shape, or a combination of two or more of these shapes.

11. A device comprising:
    a diaphragm cup that includes a diaphragm and a wall;
    a transducer; and
    a housing;
    wherein:
       the diaphragm, the wall of the diaphragm cup, and at least one part of the housing are formed as a one-piece fiber-plastic composite component;
       at least one first region of the fiber-plastic composite component is reinforced with fibers and at least one second region of the fiber-plastic composite component is free of the fibers so that waves in the fiber-plastic composite component are at least partly reflected at a transition from the at least one first region to the at least one second region,
       wherein the at least one first region includes at least one subregion of the diaphragm, the fibers being arranged in the diaphragm in the form of a multi-layer fiber structure that includes a plurality of layers that are shaped differently than one another.

12. A device comprising:
    a diaphragm cup that includes a diaphragm and a wall;
    a transducer; and
    a housing;
    wherein:
       the diaphragm, the wall of the diaphragm cup, and at least one part of the housing are formed as a one-piece fiber-plastic composite component;
       at least one first region of the fiber-plastic composite component is reinforced with fibers and at least one second region of the fiber-plastic composite component is free of the fibers so that waves in the fiber-plastic composite component are at least partly reflected at a transition from the at least one first region to the at least one second region, wherein the housing part that is formed as part of the one-piece fiber-plastic composite component is an upper part of the housing, and the housing includes a lower part that is separate from the one-piece fiber-plastic composite component and that is connected to the upper part of the housing.

\* \* \* \* \*